LUTHER R. FAUGHT.
Improvement in Cog Gearing.
No. 119,683. Patented Oct. 3, 1871.
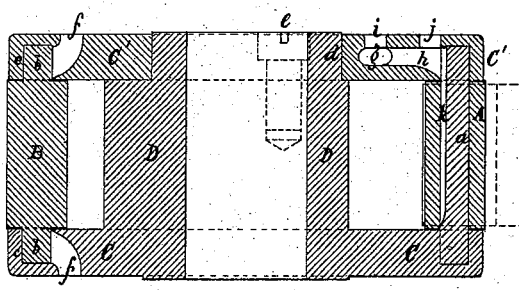
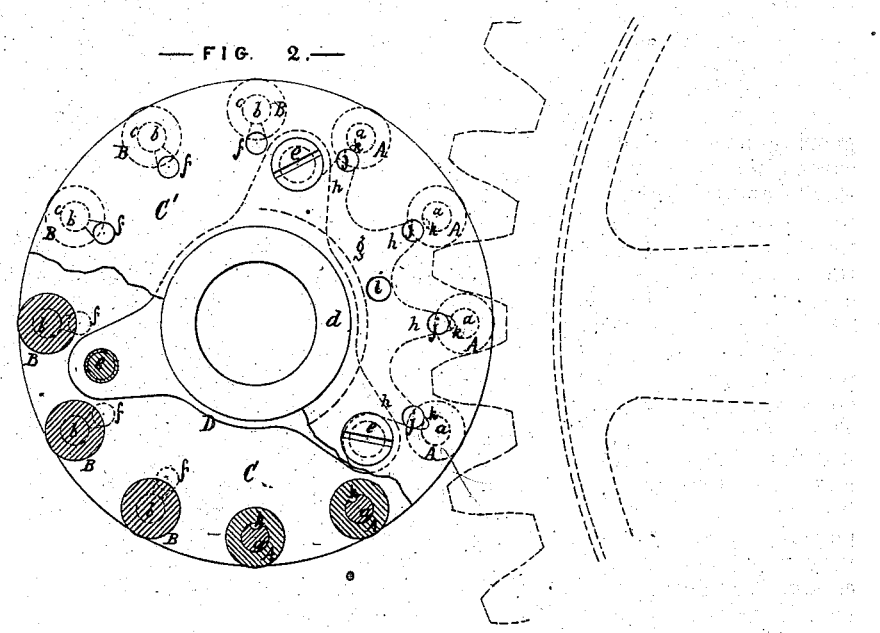
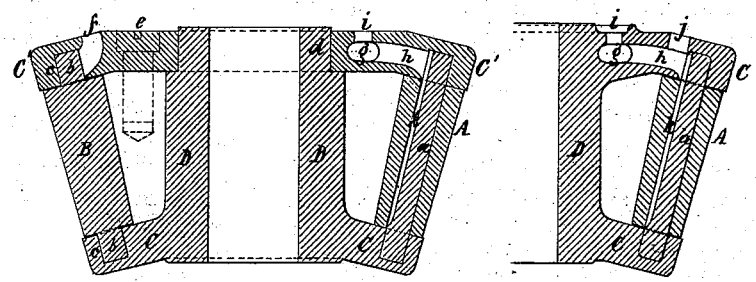

119,683

UNITED STATES PATENT OFFICE.

LUTHER R. FAUGHT, OF PHILADELPHIA, PENNSYLVANIA.

IMPROVEMENT IN COG-GEARING.

Specification forming part of Letters Patent No. 119,683, dated October 3, 1871.

*To all whom it may concern:*

Be it kown that I, LUTHER R. FAUGHT, of the city of Philadelphia and State of Pennsylvania, have invented a new and useful Improvement in Cog-Gearing, the following being a specification of my said improvement:

My invention relates more particularly to cog-gearing used for the transmission of power in cases where the contact surfaces of the cogs move slowly under great pressure and are so exposed to the action of flying dust or other gritty matter that they cannot be kept lubricated, causing thereby excessive friction, undue loss of power, and rapidly destructive wear of the gearing. The injurious effects upon gearing from the above cause is much increased when cog-wheels so exposed are employed to drive greatly-increased speed from a slow motion of the driving-power. This is the case in horse-powers, in field thrashing-machines, and in all mill-gearing for transmitting power and increasing speed from a slowly-revolving water or wind-wheel. In horse-powers, especially, as heretofore constructed, the very rapid wear and frequent breakage or necessity of renewal of the pinion-gearing with the first driver is a source of frequent stoppage and annoyance. Now the main object of my invention is to provide a means of attaining in the operation of such gearing the highest mechanical perfection, and to guard against everything which might detract from its efficiency; and the nature of my improvement consists in providing one of a pair of wheels gearing together with revolving cylindrical cogs or rollers which have their axes in the pitch circle of the wheel and are confined endwise between flanges. The improved revolving cog may be bored out through its entire length and turn upon a stationary axle, or it may be solid, and provided with two pivots revolving in corresponding sockets or step-bearings in the two flanges of the wheel; and with either construction of the revolving cogs I combine a means of lubricating the frictional end surfaces from the inside in such a manner as to effectually exclude all dust or grit from the wearing surfaces of the rollers; and as these rollers have no frictional rubbing contact with the cogs of the other wheel, but merely roll upon the fixed cogs during contact, the bearing surfaces of both are thereby exempted from undue friction and wear.

On reference to the annexed drawing, making pary of this specification, Figure 1 is a transverse section of a spur-pinion of my improved construction, showing on one side a roller revolving upon a stationary axle, and showing on the opposite side a pivoted roller revolving in socket bearings in the flanges of the wheel. Fig. 2 is a plan of Fig. 1, partly in section. Fig. 3 represents a bevel pinion of my improved construction, showing both modifications in the construction of the rollers. Fig. 4 illustrates a modified construction of the wheel, whereby both flanges are cast solid with the wheel, the rollers and axles being set in a sand core within the mold and the metal in the flanges cast around the projecting ends of the axles in the manner shown.

In the plan, Fig. 2 representing a pinion of twelve cogs or rollers, one-half of their number, A A A, are of the kind revolving upon stationary axles *a a a*, and the remaining number, B B B, have end-bearings or pivots *b b b* running in step-bearings *c c c* of flanges C C'. One of these flanges, C, is cast in one piece with the hub and body D. The flange C' is bored out to fit a corresponding projection, *d*, of the hub, and is further secured to the wheel by screws *e e*. In cases where the motion of the wheel is very slow, or frequently interrupted, the rollers may be each separately lubricated in the manner fully shown on the left side of Figs. 1, 2, and 3, through oil-holes *f f* placed at the side of the axles or pivots; but when the motion of the wheel is rapid and continuous I prefer the use of the annular lubricating channel *g*, provided within the inner portion of the flange C or C', and communicating, by means of outwardly-extending passages *h h*, with all the axles and rollers in the wheel in such a manner that the oil or grease filled into the channel *g* through one or more oil-holes *i*, near the hub, will be uniformly distributed over all the outward passages, and so fed to all the axles and rollers in the wheel. *j j* are holes provided in the flanges C or C', alongside of the axles *a a a*, for the purpose of inserting a wire into the grooves K K K cut lengthwise into the axles *a a a*, and thus removing any solidified matter which might otherwise obstruct the proper flow of the lubricator. By feeding the lubricator to the rollers in this described manner and expelling the superfluous portions thereof in an outward direction at the end-bearings of the rollers, all dust or gritty matters will be effectually kept out of the frictional surfaces and their injurious influence on these surfaces will be avoided.

I claim as my invention—

Arranging in one of a pair of wheels the revolving cylindrical cogs or rollers A A or B B, in combination with flanges C C', for protecting the wearing-surfaces and for supporting the axles $a\ a$ or $b\ b$, and containing, also, the channels $f\ f$ or $g\ h\ h$ for lubricating the frictional end surfaces from within, the whole operating in the manner and for the purpose set forth.

LUTHER R. FAUGHT.

Witnesses:
WM. HELME,
JOHN H. REDFIELD.

(63)